March 20, 1962          M. D. LISTON          3,025,745
METHOD AND APPARATUS FOR ANALYZING GASES
Filed June 30, 1953          3 Sheets-Sheet 1
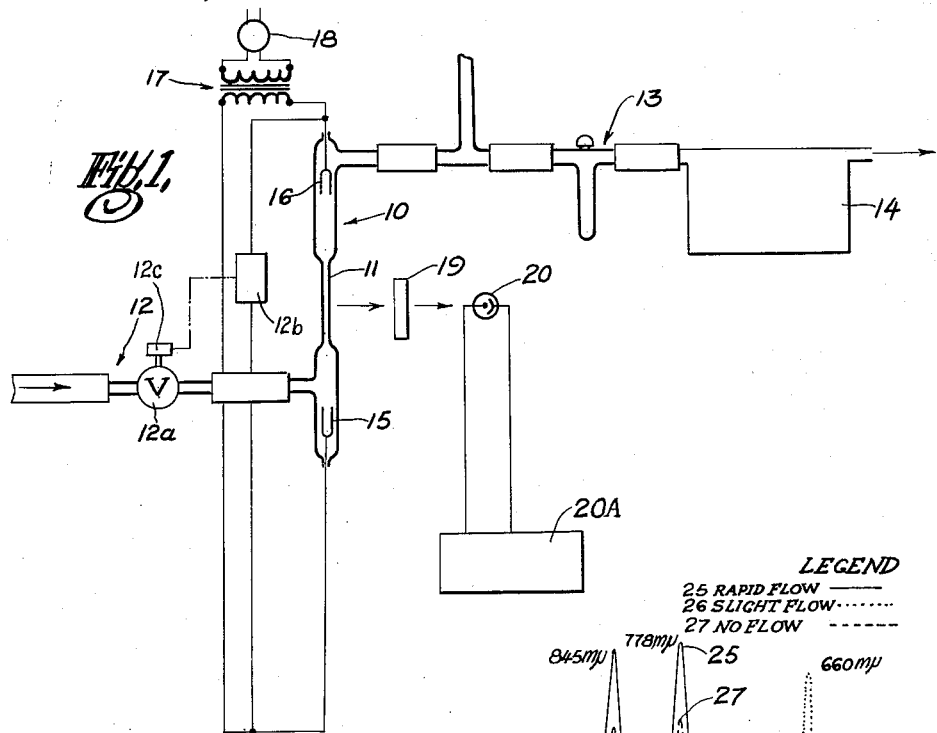
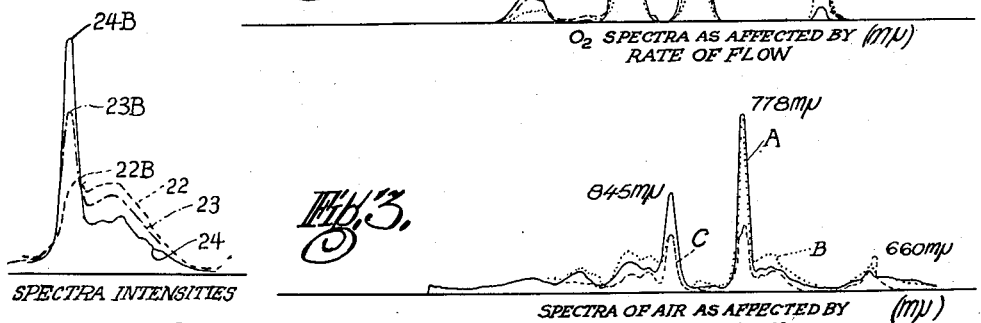
INVENTOR.
Max D. Liston
BY
Pollard and Johnston
ATTORNEYS

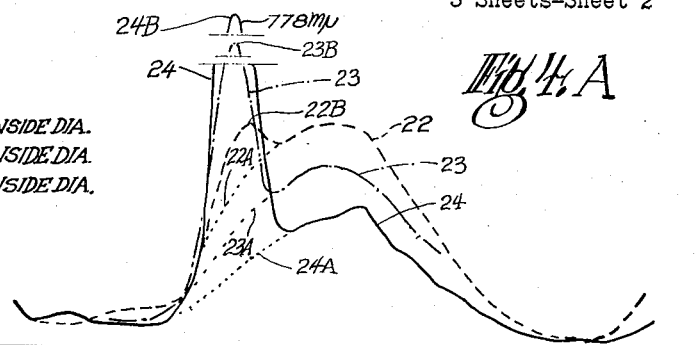
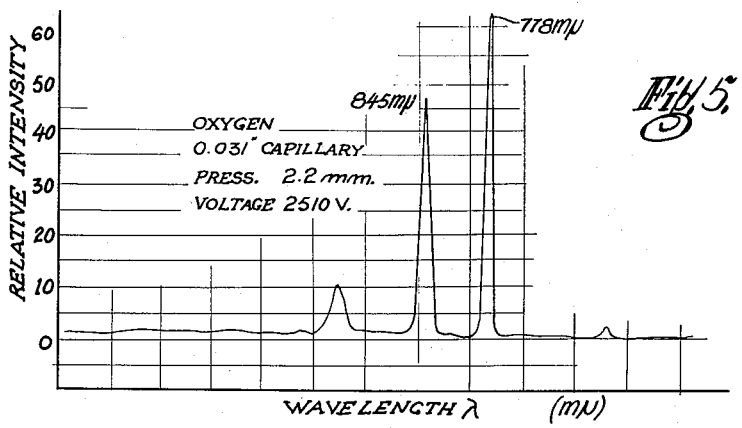
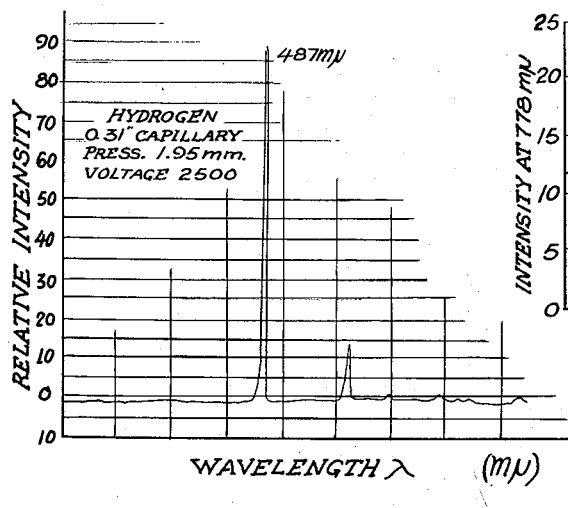
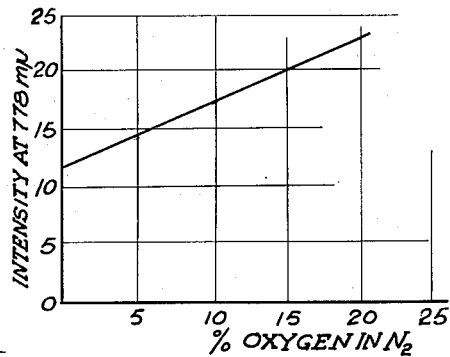

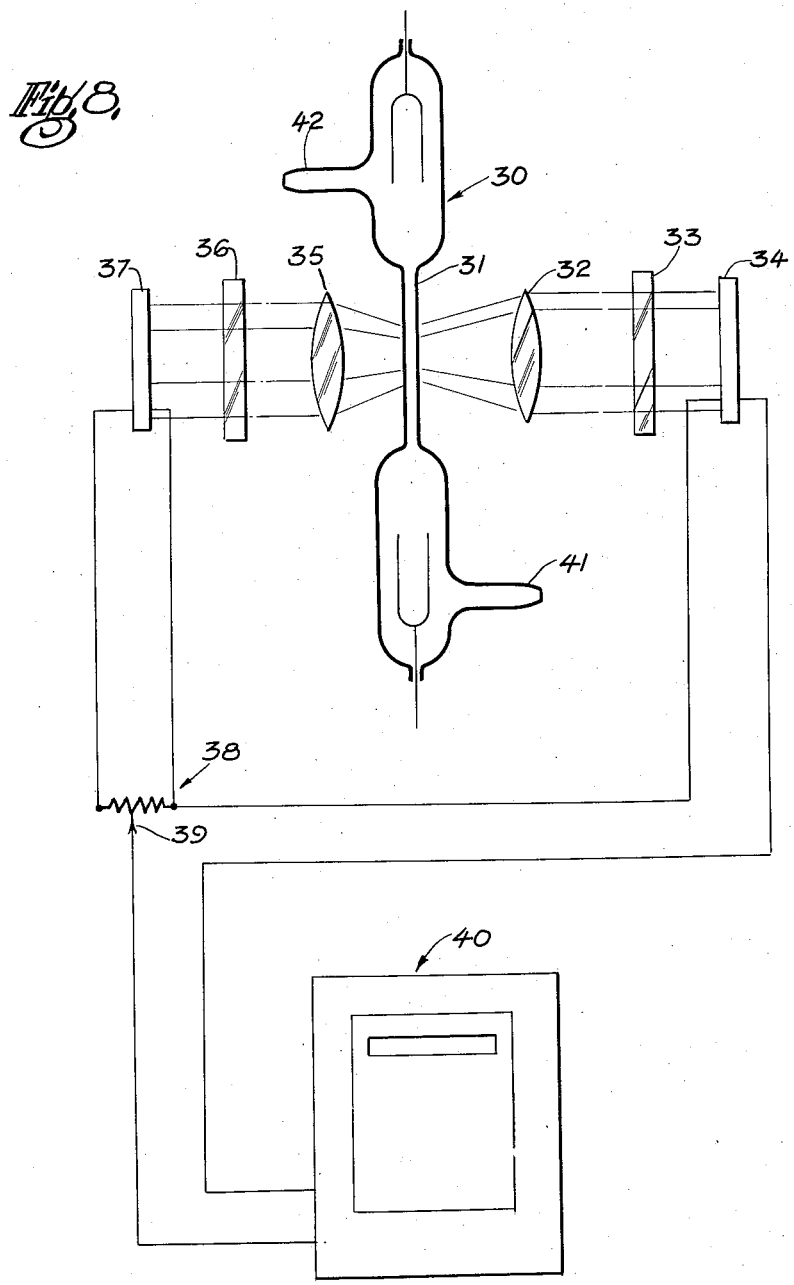

United States Patent Office 3,025,745
Patented Mar. 20, 1962

3,025,745
METHOD AND APPARATUS FOR
ANALYZING GASES
Max D. Liston, Darien, Conn., assignor, by mesne assignments, to Beckman Instruments, Inc., Fullerton, Calif., a corporation of California
Filed June 30, 1953, Ser. No. 365,221
10 Claims. (Cl. 88—14)

This invention relates to a means and method involving emission spectra for analyzing of gases.

When gas is passed continuously through an electric discharge tube of the type known generally as a Geisler tube, characteristic spectrum bands will be emitted by the gases present. When using spectrum techniques for analyses, certain of the gases, such as oxygen and hydrogen, have been difficult to determine because the spectrum intensity thereof has been insufficient as compared with other gases emitting light adjacent to or at the same frequency or wave length. For many purposes, it is desirable to be able to determine continuously the presence and concentration of selected gases, such as oxygen or hydrogen.

One of the objects of the invention is to provide a method and apparatus for producing spectrum lines having sufficient intensity to indicate presence and quantity of selected gases.

A further object of the invention is to provide a method and apparatus which will eliminate the effect of undesired spectrum.

A still further object of the invention is to provide a method and apparatus capable of analyzing continuously for certain gases, especially oxygen and hydrogen.

A further object of the invention is to provide a method and apparatus for enhancing the intensity ratio of the chosen spectrum band to other spectrum bands in the same region.

A further object is to produce an emission source sufficiently stable to provide accurate quantitative analysis.

In one aspect of the invention, a Geisler-type discharge device is employed, the device comprising two enlarged end portions connected by a capillary tube, gas being fed continuously therethrough at a relatively low absolute pressure. Electrodes are located inside the end portions and are connected to a high potential source. The pressure in the device is controlled to produce the characteristic Geisler effect when said high potential, such as one about 2000 volts, is applied to the electrodes. This color and intensity of the emitted light will change with the gas composition and this effect can be used to actuate suitable photo-sensitive devices. Certain of the gases, such as oxygen and hydrogen, have been difficult to determine in the past because the characteristic spectrum thereof has not had bands of adequate intensity. Also, there has been difficulty in discriminating from spectra in the same region resulting from other gases.

In a further aspect of the invention, the aforementioned capillary tube can be made less than a critical size so as to enhance the desired spectrum bands relative to other spectrum bands. In air, the nitrogen lines are so predominant that it is difficult to eliminate interference, making it necessary to discriminate between lines. By providing a capillary tube which is a predetermined size or less, but capable of passing gas therethrough, the oxygen and hydrogen lines or spectrum will be enhanced to the detriment of nitrogen lines. Preferably quartz, or a material consisting essentially of quartz, is employed for at least the capillary portion of the discharge device.

The light from the Geisler-type discharge device is passed through a filter or selective wavelength transmitting means designed to pass the particular spectrum band chosen or spectrum band of interest, the passed light suitably operating a photo-sensitive arrangement for producing a signal which will be proportional to the intensity passed, and thus detecting the quantity of the gas.

In still another aspect, in order further to eliminate nitrogen response effects, a second photo-sensitive device can be employed in conjunction with a filter passing a nitrogen spectrum, the signal therefrom being suitably combined through an electrical network with the signal from the first photo-sensitive device to produce the desired signal. The signal combination may be a subtraction or may be arranged to give a ratio.

These and other objects, advantages, and features of the invention will become apparent from the following description and drawings which are merely exemplary.

In the drawings:

FIG. 1 shows one form of the invention;

FIG. 2 shows the relationship of rate of flow, and intensity for the $O_2$ spectrum with the use of a capillary of 0.120 inch inside diameter;

FIG. 3 shows the relationship of rate of flow and intensity for spectra of air when using a capillary of 0.031 inch inside diameter;

FIG. 4 shows the relation of intensity when using different sized capillaries;

FIG. 4A is an enlarged view of FIG. 4, the curves being broken because of the height of the peaks;

FIG. 5 shows oxygen spectra relations;

FIG. 6 shows hydrogen spectra relations;

FIG. 7 shows the relation of intensity and proportion of gas;

FIG. 8 shows a modified form of the invention.

Referring to the drawings, the discharge device 10 may be of the Geisler-type or similar electric discharge tube having a capillary tube or passage 11 joining the enlarged ends thereof. The gas to be tested or analyzed may be fed through pipe 12 and may be exhausted through pipe 13 by vacuum pump 14, a manual or automatic flow control valve or means 12a being provided for closely regulating the flow of gas. Electrodes 15, 16 of the discharge device are located inside of the enlarged ends of the device and are energized by transformer 17, which can be of the constant current type. The transformer 17 can be connected to a source of electric power through suitable control means 18. Light filter 19 having the desired light filtering characteristics to pass the required spectrum band or bands is placed in the path of light from discharge tube 10 to photo-sensitive member or photocell 20. Photocell 20 may be connected to suitable electronic amplifying circuits and indicating or control apparatus 20A.

As is known, such gases as oxygen and hydrogen, but not limited thereto, in a discharge tube of the type concerned will emit characteristic spectrum lines. In order to utilize this effect, it is desirable to accentuate or enhance appropriate spectrum bands relative to other bands in order to obtain signals of sufficient strength to operate a recorder, indicator, or controller.

For determination of the presence of a particular gas, such as oxygen or hydrogen, it was found that the inside diameter of capillary 11 preferably should be made relatively small, the size being critical for most efficacious operation. For production of satisfactory oxygen or hydrogen spectrum bands, the capillary preferably should have an inside diameter in the range of 0.05 inch or less, but preferably of 0.031 inch or less. Referring to FIG. 4, curve 22 shows the spectrum intensity for air containing oxygen and nitrogen at the 778 millimicron ($m\mu$) band when a capillary of 0.120 inch diameted is used. FIG. 4A is an enlarged view of FIG. 4 with the peaks broken. The relatively smooth dotted extension or connecting portion 22A, FIG. 4A, across peak 22B represents the nitrogen response and peak 22B, the response due to oxygen. When the capillary is reduced to 0.031 inch, curve 24 shows the intensity for the same conditions, the smooth dotted extension 24A due to nitrogen being depressed below 22A and peak 24B due to oxygen being markedly enhanced. Curve 23 shows approximate intensity relationships for a 0.050 inch capillary, nitrogen response dotted portion 23A being depressed and peak 23B due to oxygen being enhanced relative to nitrogen so as to give an adequate response. Dotted portions 22A, 23A and 24A of the curve have been drawn in to emphasize the relationships and are approximations.

The rate of flow of gas through the tube also is critical. Because of the relatively small flow through the tube, it is difficult to measure the same directly. The voltage across the discharge tube is approximately in proportion to the flow rate and the voltage can be used in regulating the flow. As the voltage decreases, controls can be operated to increase flow of gas, some allowance being made for change in voltage due to variation in composition of the gas. In FIG. 1 a voltage responsive controller 12b may be connected across electrodes 15 and 16, a signal from controller 12b being employed to set valve actuator 12c.

When a large capillary is used, such as one having a bore of 0.12 inch, the flow rates vary from the high intensity point 25 (FIG. 2) for rapid flow to the low intensity point 26 for slight flow, the latter being less than the intensity for no flow. This is in contrast to the effect of flow when a capillary of 0.031 inch is used as shown in FIG. 3 for the spectrum of air. As can be seen in FIG. 3, the intensity for rapid flow (A) and moderate flow (B) will be about the same as compared to a much lower intensity for slight flow (C). Thus, if the flow is above a predetermined amount, the rate thereof does not seriously affect the results.

The tube 10 preferably is made of quartz or a material consisting essentially of quartz and can be operated with a pressure of between 1 mm. of mercury and 5 mm. of mercury, the voltage being in the range of 2000 volts.

For determination of oxygen in the range of 0–21% in air, the spectrum band at 778 millimicrons can be employed as seen in FIG. 5. FIG. 6 shows hydrogen spectra relations, the 487 millimicron band being the best choice. In the case of the hydrogen spectrum in a large capillary, substantially no observable hydrogen bands were observable even with a slit of 0.6 mm. However, with a capillary bore of 0.031 inch, the 487 millimicron band was off-scale with a slit width of 0.1 mm.

Merely by way of example, FIG. 7 shows the results of determination of $O_2$ in nitrogen using a pressure of 2.3 mm. and a slit of 3 mm., the capillary being 0.031 inch in diameter. It is to be noted that the discrimination ratio is high. The discrimination ratio may be defined as the ratio of the concentration of interfering element necessary to produce a given deflection change divided by concentration of the measured element or elements to which the device is sensitive necessary to produce the same deflection change.

When analyzing oxygen in air with a small capillary Geisler type tube, the nitrogen lines in the spectrum produced become so predominant that it may be difficult under some circumstances to eliminate interference. Thus, it may be desirable to provide means to eliminate the effect of similar intensity in the same spectrum region or to provide a ratio determination. Referring to FIG. 8, Geisler tube or discharge device 30 may be similar to device 10 and may have a capillary 31. The gas to be analyzed is fed in at 41 and exhausted at 42 in a manner similar to FIG. 1. Lens 32 can direct emission from the tube through filter 33, said filter passing the spectrum band of 778 millimicrons to photo-sensitive means 34. Lens 35 directs emission from tube 30 through filter 36 to photocell 37, filter 36 passing nitrogen spectrum only, for example, one in the ultra violet region.

Photocells 34 and 37 are connected together through a conventional subtracting electrical network 38 which may have an adjustable resistance 39 adjustable to balance out the signal from photocell 34 attributable to the nitrogen spectrum band. In this manner, the signal transmitted to the indicator, controller or recorder 40 will be only that due to the oxygen spectrum and will be proportional thereto. As other gases are to be tested or analyzed, filters 33 and 36 can be changed as needed and the subtracting network suitably adjusted. The signals could also be combined in a manner to give ratio of the two gases such as in a potentiometer network or in other suitable manners.

It has been found that a device operated in accordance with the aforementioned description will be accurate to within 0.3% of oxygen and 0.2% of hydrogen.

As an alternative, a single photocell could be used and the signals separated from each other in time, i.e., the photocell alternatively subjected to the two signals, suitable electronic circuits being used to indicate the desired analysis.

It is to be understood that variations can be made in the details of construction without departing from the spirit of the invention as defined in the appended claims.

What is claimed is:

1. In a special analytical apparatus providing enhanced spectral emission of a selected component of a gas mixture in a selected wavelength region relative to the emission of other components in said wavelength region, the combination of an electric discharge device adapted to contain said mixture, said discharge device having enlarged end portions and capillary tube means joining said end portions, said capillary tube means having a bore of not more than about 0.05 inch, means feeding said gas mixture to said tube means, means exhausting said gas mixture from said tube means, electrodes inside of said end portions adapted to apply an electric potential to said device for electrical discharge through said tube means, selective wavelength transmitting means receiving radiation from said discharge device and adapted selectively to transmit radiation in said selected wavelength region, and photo-sensitive means responsive to said selectively transmitted radiation for producing a signal indicative of said selected component.

2. In a spectral apparatus for measuring oxygen in a gas mixture containing nitrogen and providing enhanced emission of oxygen in a selected wavelength region relative to the emission of nitrogen in said region, the combination of an electric discharge device adapted to enclose said oxygen and nitrogen containing mixture, said discharge device having end portions and capillary tube means joining said end portions, said capillary tube means having a bore of not more than about 0.05 inch, electrodes inside of said end portions adapted to apply an electric potential to said device for electrical discharge through said tube means, selective wavelength transmitting means receiving radiation from said discharge device and adapted selectively to transmit radiation in said selected wavelength region, and photo-sensitive means responsive to said selectively transmitted radiation for producing a signal indicative of said selected component.

3. An apparatus as defined in claim 2 in which said selective wavelength transmitting means is adapted selectively to transmit radiation in the wavelength region of the 778 m$\mu$ oxygen emission band.

4. In a spectral apparatus for measuring oxygen in a gas mixture containing nitrogen and providing enhanced emission of oxygen in a selected wavelength region relative to the emission of nitrogen in said region, the combination of an electric discharge device adapted to enclose said oxygen and nitrogen containing mixture, said discharge device having end portions and capillary tube means joining said end portions, said capillary tube means having a bore of not more than about 0.05 inch, means feeding said gas mixture to be analyzed to said tube means, means for exhausting said gas mixture from said tube means, electrodes inside of said end portions adapted to apply an electric potential to said device for electrical discharge through said tube means, selective wavelength transmitting means receiving radiation from said discharge device and adapted selectively to transmit radiation in said selected wavelength region, and photosensitive means responsive to said selectively transmitted radiation for producing a signal indicative of said selected component.

5. In a spectral apparatus for measuring oxygen in a gas mixture containing nitrogen and providing enhanced emission of oxygen in a selected wavelength region relative to the emission of nitrogen in said region, the combination of an electric discharge device adapted to enclose said oxygen and nitrogen containing mixture, said discharge device having end portions and capillary tube means joining said end portions, said capillary tube means having a bore of not more than about 0.05 inch, electrodes inside of said end portions adapted to apply an electric potential to said device for electrical discharge through said tube means, selective wavelength transmitting means receiving radiation from said discharge device and adapted selectively to transmit radiation in said selected wavelength region, second wavelength transmitting means receiving radiation from said device and adapted to transmit radiation in a second wavelength region characteristic of nitrogen emission and characterized by substantially no oxygen emission, photosensitive means responsive to radiation in the first-mentioned wave length region, photosensitive means responsive to radiation in said second wavelength regions, an electrical network connected to the output of said photosensitive means for producing an output signal as a function of the oxygen emission in said selected wavelength region, said output signal being derived from the relation of the energy of the radiation transmitted by said first-mentioned and said second transmitting means, and responsive means connected to said network.

6. In an apparatus for the spectral analysis of a gas mixture for a selected component thereof, the combination of an electric discharge device having enlarged end portions housing electrodes therein, a capillary tube joining said end portions, inlet means feeding said mixture to one of said end portions, means exhausting said mixture from the other of said end portions, voltage sensing means connected across said electrodes, gas flow regulator means responsive to said voltage sensing means and adapted to control the flow of said gas to said inlet means as a function of said voltage to maintain said flow substantially constant, selective wavelength transmitting means receiving radiation from said discharge device and selectively transmitting wavelengths of said radiation characteristic of said selected component, and photosensitive means responsive to said selectively transmitted wavelengths for generating a signal as a measure of said selected gas.

7. In a spectral apparatus for measuring oxygen in a gas mixture containing nitrogen and providing enhanced emission of oxygen in a selected wavelength region relative to the emission of nitrogen in said region, the combination of an electric discharge device adapted to enclose said oxygen and nitrogen containing mixture, said discharge device having end portions and capillary tube means joining said end portions, said capillary tube means having a bore of not more than about 0.05 inch, means feeding said gas mixture to said tube, means exhausting said gas mixture from said tube means, electrodes inside of said end portions adapted to apply an electric potential to said device for electrical discharge through said tube means, selective wavelength transmitting means receiving radiation from said discharge device and adapted selectively to transmit radiation in said selected wavelength region, means for sensing the voltage across said electrodes, flow rate control means responsive to said voltage sensing means and adapted to control the flow of said gas to said inlet means as a function of said voltage to maintain said flow substantially constant, and photosensitive means responsive to said selectively transmitted radiation for producing a signal indicative of said selective component.

8. In an apparatus for the spectral analysis of a gas mixture for hydrogen in the presence of gases producing interfering background emission and for enhancing selected wavelengths of hydrogen emission relative to the background emission at said wavelengths, comprising the combination of an electric discharge device adapted to contain said mixture, said discharge device having enlarged end portions and capillary tube means joining said end portions, said capillary tube means having a bore of not more than about 0.05 inch, electrodes inside of said end portions adapted to apply an electric potential to said device for electrical discharge through said tube means, selective wavelength transmitting means receiving radiation from said discharge device and adapted selectively to transmit radiation in said selected wavelength region, and photosensitive means responsive to said selectively transmitted radiation for producing a signal indicative of said selected component.

9. The method for the spectral analysis of hydrogen in a gas mixture in the presence of nitrogen, comprising the steps of confining the flow of said mixture in a capillary tube not exceeding 0.05 inch in internal diameter, applying an electric potential across the gas stream in said capillary tube for exciting a discharge through said tube and the emission of radiation characteristic of said hydrogen, sensing the voltage drop across said discharge, said voltage drop being an inverse function of said flow, controlling the flow of said mixture through said tube as a function of said voltage drop to maintain said flow substantially constant, and measuring said emitted radiation.

10. The method for the spectral analysis of oxygen in a gas mixture in the presence of nitrogen, comprising the steps of confining the flow of said mixture in a capillary tube not exceeding 0.05 inch in internal diameter, applying an electric potential across the gas stream in said capillary tube for exciting a discharge through said tube and the emission of radiation characteristic of said oxygen, sensing the voltage drop across said discharge, said voltage drop being an inverse function of said flow, controlling the flow of said mixture through said tube as a function of said voltage drop to maintain said flow substantially constant, and measuring said emitted radiation.

References Cited in the file of this patent

UNITED STATES PATENTS

| | | |
|---|---|---|
| 1,628,256 | Machlett | May 10, 1927 |
| 1,871,226 | Skala | Aug. 9, 1932 |
| 2,037,925 | Rentschler | Apr. 21, 1936 |
| 2,094,694 | Bol et al. | Oct. 5, 1937 |
| 2,280,618 | Besson | Apr. 21, 1942 |
| 2,332,337 | Norton | Oct. 19, 1943 |
| 2,586,746 | Tyler | Feb. 19, 1952 |
| 2,617,940 | Giguere | Nov. 11, 1952 |
| 2,670,649 | Robinson | Mar. 2, 1954 |
| 2,753,479 | Aughey et al. | July 3, 1956 |

OTHER REFERENCES

"Spectrographic Determination of Nitrogen in Some Organic Nitrogen Compounds," by Frederickson and Smith, in Analytical Chemistry, vol. 23, issue No. 5, pp. 742–744 (May 1951).

UNITED STATES PATENT OFFICE
CERTIFICATE OF CORRECTION

Patent No. 3,025,745　　　　　　　　　　　March 20, 1962

Max D. Liston

It is hereby certified that error appears in the above numbered patent requiring correction and that the said Letters Patent should read as corrected below.

Column 1, line 48, for "about" read -- above --;
column 2, line 69, for "diameted" read -- diameter --;
column 4, line 26, for "special" read -- spectral --.

Signed and sealed this 10th day of July 1962.

(SEAL)
Attest:

ERNEST W. SWIDER
Attesting Officer

DAVID L. LADD
Commissioner of Patents